United States Patent
Van Den Brenk et al.

(10) Patent No.: US 11,311,041 B2
(45) Date of Patent: Apr. 26, 2022

(54) PROCESS FOR PREPARING INFANT FORMULA

(71) Applicant: N.V. NUTRICIA, Zoetermeer (NL)

(72) Inventors: Joep Van Den Brenk, Den Bosch (NL); Koen Cornelis Van Dijke, Leusden (NL); Adriana Martina Lamberta Van Der Steen, Erp (NL); Raoul Charles Johan Moonen, Amersfoort (NL); Antonie Van Baalen, Arnhem (NL)

(73) Assignee: N. V. NUTRICIA, Zoetermeer (NL)

( * ) Notice: Subject to any disclaimer, the term of this patent is extended or adjusted under 35 U.S.C. 154(b) by 1587 days.

(21) Appl. No.: 14/385,044

(22) PCT Filed: Mar. 13, 2013

(86) PCT No.: PCT/EP2013/055069
§ 371 (c)(1),
(2) Date: Sep. 12, 2014

(87) PCT Pub. No.: WO2013/135739
PCT Pub. Date: Sep. 19, 2013

(65) Prior Publication Data
US 2015/0044352 A1 Feb. 12, 2015

(30) Foreign Application Priority Data
Mar. 15, 2012 (EP) .................... 12159671

(51) Int. Cl.
*A23P 10/40* (2016.01)
*A23D 7/01* (2006.01)
(Continued)

(52) U.S. Cl.
CPC ............ *A23L 33/40* (2016.08); *A23D 7/0053* (2013.01); *A23D 7/011* (2013.01); *A23L 33/115* (2016.08); *A23P 10/40* (2016.08); *A23V 2002/00* (2013.01)

(58) Field of Classification Search
None
See application file for complete search history.

(56) References Cited

U.S. PATENT DOCUMENTS

| 6,565,885 B1 | 5/2003 | Tarara et al. |
| 2004/0043124 A1* | 3/2004 | Dybing ................ A23C 19/05 426/582 |

(Continued)

FOREIGN PATENT DOCUMENTS

| EP | 2638811 A1 | 9/2013 |
| EP | 2651247 B1 | 9/2016 |

(Continued)

OTHER PUBLICATIONS

Hall, S., Cooke, M., El-Hamouz, A., Kowalski, A. J., "Droplet break-up by in-line Silverson rotor-stator mixer," Chemical Engineering Science 66 (2011) 2068-2049 (Year: 2011).*

(Continued)

*Primary Examiner* — Jeffrey P Mornhinweg
(74) *Attorney, Agent, or Firm* — Harness, Dickey & Pierce, P.L.C.; Stephen T. Olson (57) ABSTRACT

The present invention relates to a process for preparing a lipid and protein component-containing composition comprising large lipid globules, preferably coated with polar lipids, and to the compositions obtained thereby.

19 Claims, 4 Drawing Sheets

(51) Int. Cl.
A23D 7/005 (2006.01)
A23L 33/115 (2016.01)
A23L 33/00 (2016.01)

(56) References Cited

U.S. PATENT DOCUMENTS

| | | | |
|---|---|---|---|
| 2004/0052156 A1* | 3/2004 | Brown | B01F 7/00833 |
| | | | 366/286 |
| 2004/0057867 A1* | 3/2004 | Pijls | A23L 2/46 |
| | | | 422/26 |
| 2005/0220964 A1 | 10/2005 | Rizo et al. | |
| 2007/0030322 A1 | 2/2007 | Lee et al. | |
| 2007/0104843 A1* | 5/2007 | Holst | A23C 9/142 |
| | | | 426/491 |
| 2007/0128341 A1 | 6/2007 | Bakkene et al. | |
| 2008/0113067 A1* | 5/2008 | Sarma | A23G 3/343 |
| | | | 426/89 |
| 2009/0004233 A1 | 1/2009 | Connolly et al. | |
| 2009/0005553 A1 | 1/2009 | Hassan et al. | |
| 2009/0252789 A1* | 10/2009 | Trophardy | A23L 1/0029 |
| | | | 424/463 |
| 2011/0206743 A1 | 8/2011 | Van Baalen et al. | |
| 2011/0217411 A1 | 9/2011 | Van Der Beek et al. | |
| 2011/0300204 A1 | 12/2011 | Van Der Beek et al. | |
| 2011/0300225 A1 | 12/2011 | Van Der Beek et al. | |
| 2012/0177708 A1 | 7/2012 | Leser et al. | |
| 2012/0177742 A1* | 7/2012 | McCLAIN | A61K 31/436 |
| | | | 424/490 |
| 2013/0052297 A1 | 2/2013 | Van De Heijning et al. | |
| 2015/0079235 A1 | 3/2015 | Wright et al. | |
| 2015/0079265 A1 | 3/2015 | Van Den Brenk et al. | |

FOREIGN PATENT DOCUMENTS

| | | |
|---|---|---|
| KR | 101470360 B1 | 12/2014 |
| WO | WO-0133971 A1 | 5/2001 |
| WO | WO-2005051091 A1 | 6/2005 |
| WO | WO-2007/064225 A1 | 6/2007 |
| WO | WO-2009064436 A1 | 5/2009 |
| WO | WO-2010/027258 A1 | 3/2010 |
| WO | WO-2010/027259 A1 | 3/2010 |
| WO | WO-2010/068105 A1 | 6/2010 |
| WO | WO-2010068103 A1 | 6/2010 |
| WO | WO-2010139703 A2 | 12/2010 |
| WO | WO-2011/108918 A1 | 9/2011 |
| WO | WO-2012080205 A1 | 6/2012 |

OTHER PUBLICATIONS

International Search Report, dated Apr. 9, 2013, and International Preliminary Report on Patentability, dated May 23, 2013, for PCT/EP2013/055069, ISA/EP.
Guo et al.: "Effect of processing on protein-protein and protein-lipid interactions and mineral distribution in infant formula", International Dairy Journal, vol. 9, 1999, pp. 395-397, XP002683312.
Interlocutory Decision in Opposition Proceedings in corresponding European Patent Application No. 13709099.9, mailed Jul. 12, 2019.
Admix, Inc., "DynaShear™ - Sanitary In-Line High Shear Mixers." Admix: Advanced Mixing Technologies Brochure (2002).
Borel et al., "Digestion and Absorption of Tube-Feeding Emulsions With Different Droplet Sizes and Compositions in the Rat." Journal of Parental and Enteral Nutrition, vol. 18, No. 6, pp. 534-543 (1994).
Cavazos-Garduno et al., "Effect of Pasteurization, Freeze-drying and Spray Drying on the Fat Globule and Lipid Profile of Human Milk." Journal of Food and Nutrition Research, vol. 4, No. 5, pp. 296-302 (2016).
CAVITRON® v. Hagen & Funke GmbH, "CAVITRON®Verfahrenstechnik- Rotor-/Stator-Machines." 2018 Machine Catalog in German and English, https://cavitron.de/wp-content/uploads/2018/05/Katalog_Maschinenbau_2018_WEB.pdf (2018).
CAVITRON® v. Hagen & Funke GmbH, "CAVITRON® Verfahrenstechnik." 2009 Machine Catalog in German and English (2009).
Charles Ross & Son Company, "Ultra High Shear Mixing Technology." Mixer White Papers, https://www.mixers.com/whitepapers/Ultra%20High%20Shear%20Mixing%20Technology%200824 2007.pdf (2007).
DirectIndustry, "Laboratory batch disperser-T 50 digital Ultra-Turrax® Ika." VirtualExpo, http://www.directindustry.com/prod/ika/laboratory-batch-dispersers-28268-648139.html (retrieved Jan. 8, 2014).
Hall et al., "Scaling up of Silverson rotor-stator mixers." Canadian Journal of Chemical Engineering, vol. 89, No. 5, pp. 1040-1050 (2011).
Maa et al., "Liquid-liquid emulsification by rotor/stator homogenization." Journal of Controlled Release, vol. 38, No. 2-3, pp. 219-228 (1996).
Montagne et al., "Infant Formulae - Powders and Liquids." In: Dairy Powders and Concentrated Products (ed. A.Y. Tamime), Blackwell Publishing Ltd.: Chichester, UK, pp. 294-331 (2009).
Murphy et al., "The effect of high velocity steam injection on the colloidal stability of concentrated emulsions for the manufacture of infant formulations." Procedia Food Science, 11th International Congress on Engineering and Food (ICEF11), vol. 1, pp. 1309-1315 (2011).
Neville et al., "Studies in human lactation: milk vols. in lactating women during the onset of lactation and full lactation." American Journal of Clinical Nutrition, vol. 48, No. 6, pp. 1375-1386 (1988).
Notice of Opposition against European Patent No. 2 651 247 B1, dated Jun. 20, 2017.
Schultz et al., "High-Pressure Homogenization as a Process for Emulsion Formation." Chemical & Engineering Technology, vol. 27, No. 4, pp. 361-368 (2004).
Van Dijke, "Effects on Spray Drying on Particle Size Distribution in Infant Milk Formula." Experimental Data, Danone Nutricia Research (Jun. 20, 2018).
Walstra et al., "Homogenization." In: Dairy Technology: Principles of Milk Properties and Processes, CRC Press, Marcel Dekker: New York, NY, pp. 245-265 (1999).
Weiss, "Emulsion Processing - Homogenization." Emulsion Workshop, Nov. 13-14, 2008, University of Massachusetts, Amherst, MA (2008).
Wikipedia: The Free Encyclopedia, "High-shear mixer." Wikimedia Foundation Inc., http://en.wikipedia.org/wiki/High-shear_mixer (Oct. 11, 2017).
Ystral GmbH Maschinenbau + Processtechnik, "Z-ln I ine Disperser - High shear gradients with the rotor-stator-principle." http://ystral.com/en/our-machines/z-line-disperser/ (2018).

* cited by examiner

PROCESS FOR PREPARING INFANT FORMULA

CROSS-REFERENCE TO RELATED APPLICATIONS

This application is a 371 U.S. National Stage of International Application No. PCT/EP2013/055069, filed Mar. 13, 2013, which claims priority to European Patent Application No. 12159671.2, filed Mar. 15, 2012. The disclosures of the above applications are incorporated herein by reference.

DESCRIPTION

The present invention relates to a process for preparing a lipid and protein component-containing composition comprising large lipid globules, preferably coated with polar lipids, and to the compositions obtained thereby. Optionally, the lipid and protein component-containing composition is spray-dried. The obtained compositions are for feeding infants and young children.

Infant or follow-on formulae are used successfully for feeding infants in cases where breast-feeding is impossible or less desirable. Still, the composition of such formulations should resemble breast milk as closely as possible, which is the preferred method of feeding infants to accommodate the special nutritional requirements of the fast growing and developing infant.

In natural unprocessed mammalian milk, lipids occur primarily as triglycerides contained within emulsified globules with a mean diameter of approximately 4 µm. These globules are surrounded by a structural membrane composed of phospholipids (0.2 to 1 wt. % based on total fat), glycolipids, cholesterol, enzymes, proteins, and glycoproteins. The major part of the fat component used in infant or follow-on formulae is of vegetable origin. The use of a large part of cow's milk fat is less desirable, because of a more unfavourable fatty acid profile. Additionally, long-chain polyunsaturated fatty acids of microbial, fish or egg origin are typically added to improve the fatty acid profile.

In known processes for preparing infant or follow-on formulae the fat or lipid phase comprising lipids and lipid-soluble vitamins is mixed vigorously with the aqueous phase comprising proteins and carbohydrates and the mixture is homogenised under high pressure by a conventional high pressure homogeniser alone or in combination with a high pressure pump. Thus, during homogenisation the fat phase is compartmentalized into smaller droplets so that it no longer separates from the aqueous phase and collects at the top, which is called creaming. This is accomplished by forcing the mixture at high pressure through a small orifice. This homogenisation step results in a stable oil-in-water emulsion, comprising lipid globules with a mode volume-weighted diameter of 0.1 to 0.5 µm. Due to this small globule size, which results in an increased lipid globule surface area, the relatively small amount of polar lipids, such as phospholipids, typically present in such compositions wherein the fat is mainly of vegetable origin is not sufficient to ensure that the distribution of the phospholipids corresponds to unprocessed lipid globules. Instead, the amount of protein, in particular casein, covering the lipid globules increases.

This is in contrast with the structure of lipid globules in unprocessed or raw milk, such as human milk, wherein the lipid globules are larger and the lipid globules are covered with a milk globule membrane comprising polar lipids in higher quantities than the above described processed IMF (infant milk formula). The preparation of larger lipid globules is thus desirable in order to prepare infant or follow-on formulae which more closely resemble human milk. Nutritional compositions with vegetable fat having larger lipid globules were also recently found to have long term health benefits with regard to body composition and prevention of obesity later in life. WO 2010/027258 discloses nutritional compositions with vegetable fat having larger lipid globules which are produced by applying a homogenisation step using lower pressure. WO 2010/027259 discloses nutritional compositions with larger lipid globules coated with polar lipids using a homogenisation step with a lower pressure and a higher amount of polar lipids, in particular phospholipids, present before homogenisation.

WO 2010/027258, WO 2010/027259, WO 2011/108918 and WO 2010/068105 disclose the preparation of nutritional compositions comprising a process step of mixing an aqueous phase with an oil blend using an Ultra-Turrax T50 batch mixer. In the mixing chamber of a batch mixer heterogenous mixing conditions are present, resulting in a broad lipid droplet size distribution and the formation of partially very large lipid globules. Furthermore, the liquid phases to be mixed are subjected in a batch mixer for an extended time to changing mixing conditions thereby reinforcing the upper identified effects of producing a broad droplet size distribution and forming extremely small and extremely large lipid globules. Due to inhomogeneous mixing a batch mixer disadvantageously has a higher risk of large and small fat globules.

WO 2005/051091 relates to a lipid preparation which mimics the lipid phase of human milk. The lipid preparation is produced by a homogenisation step to form a substantially homogeneous dispersion or emulsion under suitable conditions which include temperature, pressure and physical manipulation.

Borel et al. (J of Parenteral and Enteral Nutrition (1994), 18, 534-543) discloses the preparation of tube-feeding emulsions with different droplet sizes and compositions for feeding rats, wherein an emulsion from a lipid and an aqueous phase is prepared by magnetically stirring the mixture with a magnetic bar and further refining the prepared emulsion by sonification. Such a process is not suitable for a larger scale and will give too large variation in the globule size.

Thus, most of these known processes employ high pressure mixing devices, in particular homogenisers and/or high pressure pumps. In the processes employing homogenisers mostly two pressure steps are needed resulting in a capital intensive production process. Further, if low pressures are used with these homogenisers which are especially designed to use high pressures to allow for homogenisation, the operation process is hard to control in a stable way, that means the process needs a high amount of additional control which is laborious, time consuming and can result in varying end product qualities. Thus, the commercially used machinery is overdimensioned and has a low energy efficiency. This renders these processes less preferred for an economical production.

The technical problem underlying the present invention is therefore to provide a process for the preparation of a lipid and protein component-containing composition comprising large lipid globules, preferably coated with polar lipids, which allows to produce said composition without the above mentioned disadvantages.

The technical problem underlying the present invention is therefore also to provide lipid and protein component-containing compositions which overcome the above-identified disadvantages, in particular comprise a controllable, reproducible, lipid globule size.

These technical problems are solved by the processes and the products according to the independent claims.

Thus, the present invention provides in particular a process for preparing a lipid and protein component-containing composition, which is an infant formula or a follow-on formula or a growing up milk and comprises lipid globules, comprising the steps of a) providing an aqueous phase with a dry matter content of 10 to 60 wt. % (based on total weight of the aqueous phase), which comprises at least one protein component, b) providing a liquid lipid phase, which comprises at least one lipid and c) mixing the lipid phase with the aqueous phase in a ratio of 5 to 50% (w/w) using an inline mixer with at least one mixing head so as to obtain a lipid and protein component-containing composition comprising lipid globules.

Preferably, the inline mixer exerts a low shear force. Surprisingly, it was found that by using an inline mixer such a composition could be produced with much better control and reproducibility of lipid droplet size. The process additionally had the advantages that an overdimensioned machinery is not necessary and energy is used more efficiently. Surprisingly, the use of the inline mixer produces a markedly better result on the properties of the lipid globules than using a static mixer.

Without wishing to be bound by theory, the present advantages obtained may be due to the lower shear forces experienced by the lipid droplets or globules of the composition during the production process compared to standard homogenization processes. Inline mixer typically exert low shear forces. Typically, employing an inline mixer, even when used at high speed, exerts lower shear forces than conventional homogenization. Even though such in line mixers sometimes are referred to as "high shear inline mixers", the shear forces applied on the lipid globules employing such inline mixers is still lower than with conventional homogenisation. For the present invention this is still regarded as exerting a low shear force.

In particular and preferably, lower shear forces are applied during the course of the present production process starting from the mixing of the aqueous and lipid phases using an inline mixer with at least one mixing head. The present process is characterised by a very good controllability and reproducibility. Preferably, high shear forces are already avoided from the point the lipid phase is fed into the aqueous phase, which might occur before or during mixing. The present teaching, in particular the present process, results in the production of lipid globules having a volume-weighted mode diameter more close to the diameter of natural human milk lipid globules, which can be coated by a membrane of polar lipids, if desired, leading to a further resemblance of natural milk lipid globules. The composition obtainable, preferably obtained by the process according to the present invention, thus does more resemble human milk with respect to the lipid globule size and architecture. Therefore, by using the process according to the present invention employing an inline mixer an emulsion, preferably a stable oil-in-water emulsion of large lipid globules, with improved properties is provided without the need of a (two-step) homogenisation allowing both a more economical and more convenient production as well as the provision of improved nutritional compositions. Thus, the present process preferably and advantageously does not involve high pressure and/or high energy input homogenisation devices, in particular does not use sonification or a (two-step) homogeniser, but instead uses a medium or high speed inline mixer with at least one mixing head. This is advantageous in so far as homogenisers typically used for such processes exert high shear forces, whereas an inline mixer, such as used in the present process only applies low shear forces even when operated with medium to high speed.

Dynamic high pressure is conventionally used in the food industry and is sometimes also referred to as high pressure valve homomgenisation.

In a preferred embodiment of the present invention, the present process does not use a dynamic high pressure homogeniser or a dynamic high pressure homogenisation step.

In a preferred embodiment of the present invention, the present process does not use a dynamic high pressure one-step homogeniser or a dynamic high pressure one-step homogenisation process.

In a preferred embodiment of the present invention, the present process does not use a dynamic high pressure two-step homogeniser or a dynamic high pressure two-step homogenisation process.

The process according to the present invention foresees or requires in step a) the provision of an aqueous phase with a dry matter content of 10 to 60 wt. %, preferably 15 to 55 wt. %, more preferably 20 to 50 wt. %, even more preferred 25 to 50 wt. %, preferably 25 to 45 wt. %, most preferred 30 to 50 wt %. (each based on total weight of the aqueous phase), comprising at least one protein component.

It is furthermore preferred to provide the aqueous phase with a dry matter content of 30 to 60 wt. %, preferably 35 to 50 wt. %, more preferably 40 to 50 wt. %.

In the context of the present invention the term "protein component" refers to proteinaceous matter in general, which includes proteins, peptides, free amino acids but also compositions comprising proteins, peptides and/or free amino acids, i. e. are sources of protein.

The source of the protein, that means the protein component, is preferably selected in such a way that the minimum requirements of an infant for essential amino acid content are met and satisfactory growth is ensured. Hence, protein components based on cow's milk proteins such as whey protein, casein and mixtures thereof and proteins based on soy, potato or pea are preferred. In case whey proteins are used, the protein component is preferably based on acid whey or sweet whey, whey protein isolate or mixtures thereof and may include α-lactalbumin and β-lactoglobulin.

Most preferably, the source of the protein, in particular the protein component contained in the aqueous phase is selected from the group consisting of skim milk, skim milk powder, whey, whey powder, whey protein, whey protein isolate, whey protein hydrolysate, casein, casein hydrolysate and soy protein. More preferably casein and whey protein mixtures are used, even more preferably casein and whey protein in a weight ratio of between 5 and 0.2, more preferably 2 and 0.5, that means a weight ratio of casein to whey protein of 5:1 to 1:5, in particular 2:1 and 1:2. Based on dry weight the aqueous phase preferably comprises at least 3 wt. %, preferably at least 8 wt. % protein.

In a preferred embodiment the aqueous phase also contains at least one further component selected from the group consisting of digestible carbohydrates, non-digestible carbohydrates, vitamins, in particular water-soluble vitamins, trace elements and minerals, preferably according to international directives for infant formulae.

Preferred digestible carbohydrate components are lactose, glucose, sucrose, fructose, galactose, maltose, starch and maltodextrin. Lactose is the main digestible carbohydrate present in human milk. Thus, the aqueous phase preferably comprises lactose. The aqueous phase preferably comprises digestible carbohydrate, wherein at least 35 wt. %, more preferably at least 50 wt. %, more preferably at least 75 wt. %, even more preferably at least 90 wt. %, most preferably at least 95 wt. % of the digestible carbohydrate is lactose (each based on dry weight of digestible carbohydrate). Based on dry weight the aqueous phase preferably comprises at least 25 wt. % lactose, preferably at least 40 wt. %.

Preferably, the aqueous phase also comprises non-digestible oligosaccharides, preferably those with a degree of polymerization (DP) from 2 to 250, more preferably 3 to 60. The non-digestible oligosaccharide is preferably selected from the group consisting of fructooligosaccharides, such as inulin, galacto-oligosaccharides, such as transgalacto-oligosaccharides or beta-galacto-oligosaccharides, and uronic acid oligosaccharides.

Based on dry weight, the aqueous phase preferably comprises 0.25 wt. % to 20 wt. %, more preferably 0.5 wt. % to 10 wt. %, even more preferably 1.5 wt. % to 7.5 wt. % of at least one non-digestible oligosaccharide.

To prepare the aqueous phase, hereinafter also called "compounding of the aqueous phase", the at least one protein component and the above described optional further components are compounded in the aqueous phase, in particular an aqueous medium, preferably water. For this the at least one protein component as well as all other optional components may be in a dry state or present as solutions or suspensions.

Thus, said aqueous phase may be prepared for said provision step by compounding the at least one protein component and optional further components in an aqueous phase, preferably water, in the desired dry matter content. In case an aqueous phase comprising at least one protein component and optional further components is available having a lower dry matter content below 40 wt. %, such as 25. %, it may in a preferred embodiment be foreseen to concentrate, preferably evaporate, said aqueous phase, preferably by using an evaporator, prior to step a) of the present process to yield the required dry matter content.

In a preferred embodiment, this evaporation step is conducted after an optional high heat treatment (HHT). The preferred evaporation step can be performed on the aqueous phase or, in an alternative embodiment, on the mixture of the aqueous and lipid phase, preferably after homogenisation.

Preferably, after compounding all required components in the aqueous phase the pH of the aqueous phase is adjusted to 6.0 to 8.0, more preferably to 6.5 to 7.5.

Optionally, the aqueous phase is filtered by appropriate means to prevent an entering of foreign bodies, for instance impurities or pathogens, into the process.

Optionally, the aqueous phase is pasteurised or heat treated first by a preheating step, wherein the aqueous phase is heated to 60 to 100° C., preferably to 70 to 90° C., more preferably to 85° C. with a holding time of 1 second to 6 minutes, more preferably 10 seconds to 6 minutes, even more preferably 30 seconds to 6 minutes. This leads to a pre-sterilisation of the aqueous phase.

In a preferred embodiment, preferably after heating, the aqueous phase preferably undergoes a high heat treatment (HHT), wherein it is heated to temperatures over 100° C., preferably 120 to 130° C., most preferred to 124° C. This temperature is preferably held for 1 to 4 seconds, more preferably for 2 seconds.

Alternatively, other suitable methods of pasteurisation or sterilisation can be applied. Several pasteurization and sterilisation methods are known in the art and are commercially feasible.

Preferably, the HHT is performed prior to an optionally performed concentration step, preferably evaporisation step.

In a preferred embodiment of the present invention the HHT is performed on the aqueous phase alone. Accordingly, the lipid phase is added thereafter resulting in the mixing and homogenisation of the aqueous and lipid phase. In another embodiment of the present invention the HHT is performed on the mixture of the aqueous and lipid phase. This embodiment allows to customize the obtained oil blend.

During compounding of the aqueous phase the employed shear forces are not critical. Thus, the aqueous phase may be compounded using high shear forces.

In step b) of the process according to the present invention it is preferred to provide a liquid lipid phase, which comprises at least one lipid, preferably at least one vegetable lipid. The presence of vegetable lipids advantageously enables an optimal fatty acid profile, high in (poly)unsaturated fatty acids and/or more reminiscent to human milk fat. Using lipids from cow's milk alone, or other domestic mammals, provides not in any case an optimal fatty acid profile. In particular, such a less optimal fatty acid profile, such as a large amount of saturated fatty acids, is known to result in increased obesity.

Preferably, the at least one lipid, preferably vegetable lipid, contained in the lipid phase is selected from the group consisting of linseed oil, flaxseed oil, rape seed oil, such as colza oil, low erucic acid rape seed oil and canola oil, salvia oil, perilla oil, purslane oil, lingonberry oil, sea buckthorn oil, hemp oil, sunflower oil, high oleic sunflower oil, safflower oil, high oleic safflower oil, olive oil, black currant seed oil, echium oil, coconut oil, palm oil and palm kernel oil. Preferably part of the fat, that means lipid, is milk fat, more preferably anhydrous milk fat and/or butter oil. Commercially available lipids, preferably vegetable lipids, for use in the present invention preferably are in the form of a continuous oil phase. The composition obtained by the present process preferably comprises 2.1 to 6.5 g lipids, preferably vegetable lipid, per 100 ml, more preferably 3.0 to 4.0 g per 100 ml, when in liquid form, for instance as a ready-to-feed liquid or, if spray-dried, reconstituted with water.

Based on dry weight, the composition obtained by the present process preferably comprises 10 to 50 wt. %, more preferably 12.5 to 45 wt. %, preferably 12.5 to 40 wt. %, even more preferably 19 to 30 wt. % lipids, preferably vegetable lipid.

Preferably, the lipid phase comprises 50 to 100 wt. % vegetable lipids based on total lipids, more preferably 70 to 100 wt. %, even more preferably 75 to 97 wt. %. Preferably, the lipid phase comprises at least 75 wt. %, more preferably at least 85 wt. % triglycerides based on total lipids.

Preferably, the lipid phase comprises further components such as fat-soluble vitamins, preferably according to international directives for infant formulae.

According to the present invention it is preferred that the lipid phase is liquid at the temperature(s) used during the process. However, if the lipid phase is solid due to its composition it is preferably heated to above the melting temperature of the at least one lipid, preferably vegetable lipid, contained in the lipid phase. In a particularly preferred embodiment of the present invention the lipid phase is heated to a temperature above its melting point, preferably to a temperature of 40 to 80° C., preferably 50 to 70° C., more preferably to 55 to 60° C. thereby resulting in a liquid lipid phase. Most preferably, the lipid phase is heated to a temperature of at least 40° C., preferably at least 45° C., more preferably at least 50° C., most preferred to at least 55° C.

If required, the lipid phase is preferably filtered by appropriate filtration devices prior to the next step, preferably step c), to prevent foreign bodies, for instance impurities or pathogens, from entering the production process.

The lipid or fat globules of natural human milk comprise a globule membrane which comprises polar lipids, in particular phospholipids. Thus, it is desirable to provide an infant formula comprising lipid globules comprising a membrane or coating of polar lipids, in particular phospholipids. Thus, in a particularly preferred embodiment of the present process the aqueous phase, the lipid phase or the aqueous and the lipid phase comprise polar lipids, preferably phospholipids, in particular comprise added polar lipids, preferably phospholipids. If the polar lipids, in particular phospholipids are relatively pure, preferably do not contain significant quantities of other components, preferably are pure, such as soy lecithin, they are preferably added to the lipid phase. In case the polar lipids, in particular phospholipids are impure, preferably relatively impure and therefore contain significant quantities of other components which are not dissolvable in the fat or lipid phase, such as when they are present in butter milk serum powder, they are preferably added to the aqueous phase. Most preferred, the polar lipids, in particular phospholipids are comprised in the aqueous phase.

In a preferred embodiment of the present invention, the polar lipids are already contained in the lipid phase to be used according to the present invention. In a furthermore preferred embodiment the polar lipids are added into the aqueous or the lipid phase or both provided in steps a) or b) of the present process. In a furthermore preferred embodiment the polar lipids may also be added during process step c) during mixture of the lipid and the aqueous phase.

If polar lipids are present in either the aqueous phase, which is preferred, or the lipid phase or in both, the lipid globules preferably become coated with the polar lipids.

By "coated" or "coating" is meant that the outer surface layer of the lipid globule comprises polar lipids, whereas these polar lipids are virtually absent from the core of the lipid globule. The presence of polar lipids as a coating or outer layer of the lipid globule resembles the structure of lipid globules of human milk. Polar lipids are amphipathic of nature and include glycerophospholipids, glycosphingolipids, sphingomyelin and cholesterol. More preferably, polar lipids comprise phospholipids, which refer to the sum of glycerophospholipids and sphingomyelin. Polar lipids according to the present invention relate to the sum of glycerophospholipids, glycosphingolipids, sphingomyelin and cholesterol. Most preferred are glycerophospholipids. Glycerophospholipids are a class of lipids formed from fatty acids esterified at the hydroxyl groups on carbon-1 and carbon-2 of the backbone glycerol moiety and a negatively-charged phosphate group attached to carbon-3 of the glycerol via an ester bond, and optionally a choline group, which then refers to phosphatidylcholine (PC); a serine group, which then refers to phosphatidylserine (PS); an ethanolamine group, which then refers to phosphatidylethanolamine (PE); an inositol group, which then relates to phosphatidylinositol (PI) or a glycerol group, which then refers to phosphatidylglycerol (PG) attached to the phosphate group. Lysophospholipids are a class of phospholipids with one fatty acyl chain. Preferably, the polar lipids contain PC, PS, PI and/or PE, more preferably at least PC.

Polar lipids preferably also comprise glycosphingolipids. The term glycosphingolipids as in the present invention particularly refers to glycolipids with an amino alcohol sphingosine. The sphingosine backbone is O-linked to a charged headgroup such as ethanolamine, serine or choline backbone. The backbone is also amide linked to a fatty acyl group. Glycosphingolipids are ceramides with one or more sugar residues joined in a β-glycosidic linkage at the 1-hydroxyl position. Preferably, polar lipids also contain gangliosides, more preferably at least one ganglioside selected from the group consisting of GM3 and GD3. GM3 is a ganglioside having the formula: aNeu5Ac(2-3)bDGalp(1-4)bDGlcp(1-1)Cer, whereas GD3 is a ganglioside having the formula: aNeu5Ac(2-8)aNeu5Ac(2-3)bDGalp(1-4)bDGlcp(1-1)Cer, wherein aNeu5Ac is 5-acetyl-alpha-neuraminic acid, bDGalp is beta-D-galactopyranose, bDGlcp is beta-D-glucopyranose and Cer is ceramide.

Polar lipids preferably also comprise sphingomyelin. Sphingomyelins have a phosphorylcholine or phosphorylethanolamine molecule esterified to the 1-hydroxy group of a ceramide. They are classified as phospholipid as well as sphingolipid, but are not classified as a glycerophospholipid nor as a glycosphingolipid. Sphingolipids are in the present invention defined as the sum of sphingomyelin and glycosphingolipids. Phospholipids are in the present invention preferably defined as the sum of sphingomyelin and glycerophospholipids. Preferably, the phospholipids are derived from milk lipids. Preferably, the weight ratio of phospholipids:glycosphingolipids is from 2:1 to 10:1, more preferably 2:1 to 5:1.

Polar lipids preferably also comprise phospholipids. Preferably, the compositions comprise 0.5 to 20 wt. % phospholipids based on total lipid, more preferably 0.5 to 10 wt. %, more preferably 1 to 10 wt. %, even more preferably 2 to 10 wt. % even more preferably 3 to 8 wt. % phospholipids based on total lipid. Preferably, the compositions comprise 0.1 to 10 wt. % glycosphingolipids based on total lipid, more preferably 0.5 to 5 wt. %, even more preferably 2 to 4 wt %. Preferably, the compositions comprise 0.5 to 10 wt. % (glycosphingolipids plus phospholipids) based on total lipid, more preferably 1.0 to 10 wt. % (glycosphingolipids plus phospholipids) based on total lipid. The compositions preferably also comprise cholesterol. The compositions preferably comprise at least 0.005 wt. % cholesterol based on total lipid, more preferably at least 0.02 wt. %, more preferably at least 0.05 wt. %, even more preferably at least 0.1 wt. %. Preferably, the amount of cholesterol does not exceed 10 wt. % based on total lipid, more preferably does not exceed 5 wt. %, even more preferably does not exceed 1 wt. % of total lipid. Preferably, the compositions comprise 0.6 to 25 wt. % polar lipids based on total lipid, wherein the polar lipids are the sum of phospholipids, glycosphingolipids, and cholesterol, more preferably 0.6 to 12 wt. %, more preferably 1 to 10 wt. %, even more preferably 2 to 10 wt %, even more preferably 3.0 to 10 wt. % polar lipids based on total lipid, wherein the polar lipids are the sum of phospholipids, glycosphingolipids, and cholesterol.

Preferred sources for providing the phospholipids, glycosphingolipids and/or cholesterol are egg lipids, milk fat, buttermilk fat and butter serum fat, such as beta serum fat. A preferred source for phospholipids, particularly PC, is soy lecithin and/or sunflower lecithin. The compositions preferably comprise phospholipids derived from milk. Preferably, the compositions comprise phospholipids and glycosphingolipids derived from milk. Preferably, also cholesterol is obtained from milk. Preferably, the polar lipids are derived from milk. Polar lipids derived from milk include the polar lipids isolated from milk lipid, cream lipid, butter serum lipid (beta serum lipid), whey lipid, cheese lipid and/or buttermilk lipid. The buttermilk lipid is typically obtained during the manufacture of buttermilk. The butter serum lipid or beta serum lipid is typically obtained during the manufacture of anhydrous milk fat from butter. Preferably, the phospholipids, glycosphingolipids and/or cholesterol are obtained from milk cream. The compositions preferably comprise phospholipids, glycosphingolipids and/or cholesterol from milk of cows, mares, sheep, goats, buffalos, horses and camels. It is most preferred to use a lipid extract isolated from cow's milk. The use of polar lipids from milk fat advantageously comprises the polar lipids from milk fat globule membranes, which are more reminiscent to the situation in human milk. Polar lipids derived from fat milk advantageously decrease body fat mass later in life to a larger extent than polar lipids from other sources.

Preferably, the polar lipids are located on the surface of the lipid globules, that means as a coating or outer layer after the mixing step c) of the present process. This advantageously also leads to more stable lipid globules. A suitable way to determine whether the polar lipids are located on the surface of the lipid globules is laser scanning microscopy.

The concomitant use of polar lipids derived from domestic animals milk and trigycerides derived from vegetable lipids therefore enables to manufacture coated lipid globules with a coating more similar to human milk, while at the same time providing an optimal fatty acid profile. Suitable commercially available sources for milk polar lipids are BAEF, SM2, SM3 and SM4 powder of Corman, Salibra of Glanbia, and LacProdan MFGM-IO or PL20 from Aria. Preferably, the source of milk polar lipids comprises at least 4 wt. % phospholipids based on total lipid, more preferably 7 to 75 wt. %, most preferably 20 to 70 wt. % phospholipids based on total lipid. Preferably, the weight ratio phospholipids to protein is above 0.10, more preferably above 0.20, even more preferably above 0.3. Preferably at least 25 wt. %, more preferably at least 40 wt. %, most preferably at least 75 wt. % of the polar lipids is derived from milk polar lipids.

Thus, in a preferred embodiment of the present invention the compositions produced with the present process comprise polar lipids, such as phospholipids, glycolipids, sphingomyelin, and cholesterol, monoglycerides, diglycerides, triglycerides and free fatty acids.

The lipid globules produced by the present process preferably comprise a core and preferably a coating, wherein the core comprises a lipid, preferably vegetable lipid. Preferably, the core comprises at least 90 wt. % triglycerides, more preferably consists of triglycerides. The coating preferably comprises polar lipids, in particular phospholipids, wherein not all polar lipids that are contained in the composition need to be comprised in the coating. Preferably, at least 50 wt. %, more preferably at least 70 wt. %, even more preferably at least 85 wt. %, most preferred more than 95 wt. % of the polar lipids, in particular phospholipids present in the composition are comprised in the coating of the lipid globules. Also, not all lipids, preferably vegetable lipids, present in the composition necessarily need to be comprised in the core of the lipid globules. Preferably, at least 50 wt. %, more preferably at least 70 wt. %, even more preferably at least 85 wt. %, even more preferably at least 95 wt. %, most preferred more than 98 wt. % of the lipids, preferably vegetable lipids, comprised in the composition are comprised in the core of the lipid globules.

In a preferred embodiment of the present invention it is foreseen or required that the liquid lipid phase provided in step b) is fed into the aqueous phase provided in step a) prior to or during the mixing step c). In a preferred embodiment of the present invention the liquid lipid phase is fed into the aqueous phase with low pressure, preferably at most 10 bar, more preferably at most 8 bar.

The present invention in an advantageous manner foresees or requires to use an inline mixer with at least one mixing head, in particular with one, two, three or more mixing heads, preferably two mixing heads, in process step c), preferably which exert(s) a low shear force. In a particularly preferred embodiment it is, however, in addition foreseen to use the same shear forces, preferably low shear forces, also in process steps relating to the provided liquid lipid phase of step b), namely to process said provided liquid lipid phase under low shear forces, in particular to feed the liquid lipid phase provided in step b) under low shear force into the aqueous phase prior to or during mixing. In consequence thereof, the liquid lipid phase provided in step b) is during its processing in the present process preferably never subjected to higher shear forces.

Step c) of the process according to the present invention foresees or requires the mixing of the lipid phase with the aqueous phase. Preferably, mixing is conducted at a ratio of 5 to 50% (w/w) preferably 10 to 40% (w/w), more preferably 15 to 30% (w/w) lipid to aqueous phase. In the context of the present invention, a ratio of e. g. 5 to 50% refers to a ratio from 5 parts lipid:95 parts aqueous phase to 50 parts lipid:50 parts aqueous phase.

In the context of the present invention the term "inline mixer" refers to a mixer, which comprises a housing, an inlet, an outlet and at least one mixing head comprising at least one stator and at least one rotor, wherein the housing is configured and formed in a way to force substantially all, preferably all, of the fluid to be mixed through the at least one mixing head.

To facilitate mixing, a medium or high speed inline mixer, with one or more mixing head(s), is used. An inline mixer disperses one liquid phase, i. e. the liquid lipid phase of the present invention, into a main continuous phase, i. e. the aqueous phase of the present invention, with which it would normally be immiscible in order to prepare a oil-in-water emulsion. Thus, for the mixing step of the present process preferably an inline mixer is used to create an emulsion, preferably a stable emulsion, comprising lipid globules. Preferably, the lipid phase is emulsified in the aqueous phase under such conditions that large lipid globules are created. Preferably, the used inline mixer consists of a rotor, a set of rotors or rotating disc(s) and a same amount of stationary disk(s) known as stator(s), wherein each pair of rotor or rotating disc and stator is referred to as mixing head. The rows of rods or pins positioned on both the rotor and stator disks create rapidly changing speed differences in a mixing head trough which the solutions to be mixed flow. Preferably, the lipid phase is added or injected into the aqueous phase shortly before entering the inline mixer. Preferably already from this point onwards, high shear forces are to be avoided in the process according to the present invention.

In general, shear is created in an inline mixer by the rotating and static pins of the mixing head through which the fluid is forced, that means the fluid experiences the speed of one rotating pin and then almost no speed at a static pin. Depending on the number of rows of pins on each disk this can be repeated several times. An inline mixer for preferred use in the present invention uses a rotating disc or high speed rotor, or a series of such inline rotors, also called mixing heads, usually powered by an electric motor, to create flow and shear, preferably low shear. Low shear is meant to refer to lower shear than applied during conventional homogenization. The velocity, or tip speed of the fluid at the outside diameter of the rotor will be higher than the velocity at the centre of the rotor, which creates shear. In an inline mixer, for preferred use in the present invention, the rotor-stator array or mixing head is contained in a housing with an inlet at one end and an outlet at the other. Such a housing can also contain more than one mixing head. Depending on the specific inline mixer model the fluid flows from the outside to the inside of the discs or vice versa. Mostly, the components to be mixed are drawn through the rotor-stator array in a continuous stream, with the whole acting as a centrifugal pumping device. Alternatively, a pump vane can be added to the mixer shaft. Thus, inline mixers offer a more controlled mixing environment and can preferably be used in the present process as part of a continuous production process, preferably resulting in a more economical production process.

Preferably, a medium or high speed inline mixer, in particular a high speed inline mixer, is used in the process according to the present invention.

In the present process it is preferred to avoid high shear forces. Thus, it is preferred to use lower shear force relative to standard homogenisation during the complete process, preferably at least from the fat injection point onwards, that means during and after the step of feeding the liquid lipid phase into the aqueous phase, e. g. prior to or during mixing step c).

In a preferred embodiment of the present process the inline mixer is therefore used at 4000 to 15000 rpm, preferably 6500 to 12000 rpm. The speed might be lower depending on mixer design and diameter of the disks. In a preferred embodiment, the inline mixer stirs the mixture with a speed of 20 to 50 m/s, preferably 30 to 50 m/s, more preferably 41 to 44 m/s at the tip. In a particularly preferred embodiment of the present invention, the speed is at least 25 m/s, preferably 25 to 60 m/s.

However, both of these parameters are largely dependent on the type and model and the size (diameter of rotor and stator) of the inline mixer used, in particular the mixing head, but can be determined by the skilled person. With a larger in line mixer for example there is the need for a lower rpm. Thus, exerted shear forces are adjusted accordingly to obtain the preferred large lipid globules. Advantageously and preferably, an inline mixer exerts tangential shear instead of elongational shear. Due to the preferred low tangential shear preferably employed by the present process the resulting lipid globules are larger than in standard infant formulae.

In general, homogenisation is used to emulsify the lipid phase in the aqueous phase to reduce creaming and oxidation of the fatty acids. In standard infant formulae rather small globules are produced leading to a very stable emulsion. Since the present process aims to produce larger lipid globules this might result in a less stable emulsion and faster oxidation of fatty acids. Instead, it was found that with the composition produced by the present process excessive creaming did not occur within 24 h and when fatty acid oxidation was measured after 18 months of storage it was found to be acceptable. Surprisingly, it was even very similar to that observed with standard infant formula, despite an increased amount of free fat. The presence of a little bit of creaming was even found to be advantageous since it mimics the situation during breast feeding.

In a preferred embodiment of the present invention the lipid phase is mixed with the aqueous phase in step c) of the present process for a mixing time or residence time in the mixing head from 0.05 to 10, preferably 0.08 to 10, preferably 0.3 to 10, preferably 0.5 to 9, in particular 0.7 to 8, in particular 1 to 7, preferably 2 to 6, most preferably 3 to 5 seconds.

In a preferred embodiment the lipid and protein component-containing composition is obtained in step c) at a pressure of at most 10 bar, preferably below 10 bar, preferably at most 8 bar, preferably below 8 bar, more preferably at most 7 bar, preferably below 7 bar.

In a particularly preferred embodiment of the present process the lipid and protein component-containing composition obtained in step c) is then reheated to 75 to 85° C., preferably 78 to 80° C. to further reduce, preferably completely eliminate pathogenic bacteria. Advantageously, reheating at this stage also leads to a reduction of viscosity. Preferably, the lipid globules, also called lipid droplets, of the composition produced with the process according to the present invention have a volume-weighted mode diameter of at least 1 μm, preferably of at least 2 μm, more preferably of at least 3 μm, most preferred of at least 3.5 μm, even more preferably about 4 μm. Preferably the volume-weighted mode diameter should be below 20 μm, preferably below 10 μm, more preferably below 7 μm. In particular, the lipid globules of the composition produced with the process according to the present invention have a volume-weighted mode diameter from 1 to 20 μm, preferably 1 to 10 μm, preferably from 2 to 8 μm, more preferably from 3 to 8 μm, most preferred from 4 to 7 μm. The term "volume-weighted mode diameter" relates to the diameter which is the most present based on volume of total lipid, or the peak value in a graphic representation, having on the x-axis the diameter and on the y-axis the volume in %.

Advantageously, the lipid and protein component-containing composition comprising large lipid globules, obtained in step c) of the present process has a lower apparent dynamic viscosity between 30 and 80 cP due to the higher temperature achieved by reheating. Compared to conventional processes a lowering of the viscosity of about 5 cP occurs. Advantageously, this reduction of viscosity leads in turn to an increased capacity during an optional spray-drying step.

In a particularly preferred embodiment of the present invention the lipid and protein component-containing composition obtained after step c) of the present process is used as an infant formula, preferably a ready-to-feed liquid infant formula, a follow-on formula or growing up milk.

In a further particularly preferred embodiment the lipid and protein component-containing composition obtained in step c) of the present process is spray-dried with an atomization system, preferably a low shear atomization system, preferably employing a two-fluid nozzle, so as to obtain a spray-dried lipid and protein component-containing composition comprising lipid globules.

In a particularly preferred embodiment the total solid content of the lipid and protein component-containing composition, in particular mixture, to be atomized has a dry matter content of 30 to 65 wt. %, preferably 40 to 60 wt. %, more preferably 50 to 60 wt. %.

The use of a two-fluid nozzle has marked advantages over a wheel atomizer.

The lipid and protein component-containing composition obtained after step c) of the process according to the present invention comprises large lipid globules and advantageously and preferably has a lower apparent dynamic viscosity which preferably in an optional subsequent spray-drying step enables a higher total solid content which is economically highly beneficial.

Concomitantly, when applying spray-drying in the process according to the present invention a higher smouldering temperature, in particular a smouldering temperature of from 190° C. to 210° C., preferably of from 195° C. to 200° C., can be achieved during spray-drying which preferably and beneficially allows the use of higher temperatures during spray-drying leading to an increased capacity of the spray-drier. In prior art processes smouldering temperatures of around 185° C. are typically achieved.

Thus, preferably and advantageously, with the lipid and protein component-containing composition obtained in the present process step c) the smouldering temperature is higher, enabling a higher temperature during spray-drying, which is economically an advantage. Without wishing to be bound by theory, the higher smouldering temperature might be due to the reduced surface area of the large lipid globules.

In the context of the present invention the term "smouldering temperature" means the temperature at which the product starts an exothermic reaction, that means when a certain amount of energy is reached. This normally occurs in lumps of the product which insulate the core of the lump and allow for a temperature increase. This needs a certain initial temperature and a certain time to start. When the reaction starts the powder product starts to self ignite and the higher the temperature the faster the reaction progresses. Thus, from a safety point of view there is a maximum temperature at which a powder can be dried. Drying at a higher temperature bears the risk of the formation of an ignition source which might lead to an explosion in the drier. Thus, the smouldering temperature means auto ignition temperature which is different for a specific powder and depends on a number of variables. The present process advantageously allows for a higher smouldering temperature, that means the temperature at which the risk of self ignition of the powder exists is higher than in known processes.

Preferably, the spray-drying step using an atomization step, preferably a low shear atomization step, uses a pump, preferably a low pressure pump, to control the feed of the composition obtained in step c) to the spray-drier. Preferably, said pump uses at most the shear forces applied by the inline mixer of step c). Thus, it is preferred that the shear forces exerted on the lipid globules in the subsequent spray-drying step, in particular the feeding, in particular pumping, step do not exceed the shear forces experienced during mixing. Preferably, a positive displacement pump is used to control the feed of the mixture to the spray-drier. A positive displacement pump causes a fluid to move by trapping a fixed amount of the fluid and then displacing the trapped volume of fluid into the discharge pipe.

If a two-fluid nozzle, hereinafter also called two-fluid lance is used for spray-drying the pressure is preferably as low as possible without fouling the spray drier, which would lead to unnecessary cleaning. Preferably, the two-fluid nozzle is used with a pressure of at most 10 bar, preferably at most 8 bar, more preferably 1.5 to 5 bar, most preferably 2.5 to 4 bar.

Two fluid nozzles (2F nozzle) are commercially available. The nozzles can be equipped with an external mixing cap or with an internal mixing cap. Internal 2F nozzles have the advantage to have slightly lower energy requirements. Internal and external 2F nozzles yield different spray angles and it will depend on the design of the used dryer which type of 2F nozzle is preferred. This is easily deducible to a person skilled in the art.

The pressure used for the two-fluid nozzle might differ according to which specific model is used but can be determined accordingly by a skilled person under the condition that the lipid globules produced in the mixing step are not subjected to higher shear forces than those experienced during mixing.

In a preferred embodiment, both process step c), that means mixing of the lipid and aqueous phase, and the spray-drying are conducted under conditions exerting low forces, preferably shear forces, onto the composition processed.

The preferred two-fluid nozzles have preferably a particularly high spraying capacity, which is advantageous for an economical production. Further, the preferred use of a two-fluid nozzle allows for much lower pressures to be applied during spray-drying, which preferably results in a reduction of shear forces exerted onto the lipid globules. In spray-drying processes known in the art pressures as high as 200-300 bar are used. In a preferred embodiment of the present process, the pressure used for spray-drying is at most 10 bar, preferably below 10 bar, preferably at most 9 bar, preferably below 9 bar, more preferably at most 8 bar, preferably below 8 bar, preferably at most 5 bar, preferably below 5 bar, preferably at most 4 bar, preferably below 4 bar, preferably at most 3.5 bar, preferably below 3.5 bar, preferably from 1.5 to 5 bar, most preferred from 2.5 to 4 bar, preferably from 2.7 to 3.5 bar, in particular 3 bar.

The gas used for spraying is preferably compressed air. Preferably, the gas used for drying is preferably filtered atmospheric air. The gas/liquid flow ratio's (kg/kg) is preferably between 1:1 and 1:4, preferably 1:1 to 1:3, in particular 1:2.

Furthermore preferred, the drying gas in step d) has an inlet temperature of at least 160° C., preferably at least 180° C., preferably at least 190° C., more preferably at least 195° C.

Preferably, the spray-dried lipid and protein component-containing composition is obtained subsequent to spray-drying according to the present invention as a spray-dried powder which preferably can then be filled in appropriate containers. Thus, the present composition is in one embodiment in solid form, preferably spray-dried form, preferably powdered form.

In a particularly preferred embodiment further components which are already present in dry form, such as some minerals, vitamins, and non digestible oligosaccharides are dry blended into the spray-dried lipid and protein component-containing composition before it is filled into containers.

However, the present spray-dried composition may also be in liquid form, preferably after reconstitution of the obtained spray-dried form in an aqueous medium.

Advantageously, the larger lipid globules, which preferably are coated by a membrane of polar lipids and thus more resemble the diameter and composition of natural human milk lipid globules are also preserved after the optional spray-drying, in particular after subsequent reconstitution in an aqueous medium. Thus, upon reconstitution with water the spray-dried composition prepared by the present process still displays these features.

In case ingredients specified herein to be added either to the aqueous or the lipid phase are sensitive to the temperature(s) or conditions employed during any of the steps of the process according to the present invention they might also be added at a later point in the process, such as after mixing and before the optional spray-drying or even after spray-drying.

The present invention also relates to a lipid and protein component-containing composition, which is liquid, comprising lipid globules with a volume-weighted mode diameter of at least 1 μm, preferably at least 2 μm, more preferably at least 3 μm, even more preferred at least 3.5 μm, most preferably about 4 μm, obtainable, preferably prepared, according to the process of the present invention. Preferably, the volume-weighted mode diameter should be below 20 μm, preferably below 10 μm, more preferably below 7 μm. In particular, the lipid globules of the composition produced with the process according to the present invention have a volume-weighted mode diameter from 1 to 20 μm, preferably 1 to 10 μm, preferably from 2 to 8 μm, more preferably from 3 to 8 μm, most preferred from 4 to 7 μm.

The present invention also relates to a spray-dried lipid and protein component-containing composition comprising lipid globules with a volume-weighted mode diameter of at least 1 μm, preferably at least 2 μm, more preferably at least 3 μm, even more preferably at least 3.5 μm, most preferred about 4 μm, obtainable, preferably prepared, according to the process of the present invention. Preferably, the volume-weighted mode diameter should be below 20 μm, preferably below 10 μm, more preferably below 7 μm. In particular, the spray-dried lipid globules of the composition produced with the process according to the present invention have a volume-weighted mode diameter from 1 to 20 μm, preferably 1 to 10 μm, preferably from 2 to 8 μm, more preferably from 3 to 8 μm, most preferred from 4 to 7 μm. The compositions obtained according to the present processes exhibit improved powder properties and an improved homogeneity. Further, the fat content and the particle size distribution of the present compositions is well controllable. It was found that the powdered composition obtained by the present process had good shelf-life stability. The powder had an excellent wettability and dissolvability properties upon reconstitution with water, which was improved when compared with powder of standard formula with smaller lipid globules.

Preferably, the lipid and protein component-containing composition obtained after mixing or the spray-dried lipid and protein component-containing composition obtained after optional spray-drying prepared by the process according to the present invention is a nutritional or pharmaceutical composition, preferably an infant formula or a follow-on formula or a growing up milk. Thus, preferably, the compositions are liquid or a powder suitable for making a liquid composition after reconstitution with an aqueous solution, preferably water. Advantageously, the size of the lipid globules and the coating with polar lipids, if present, remain the same after the optional spray-drying and subsequent reconstitution. Preferably, the spray-dried composition of the present invention is reconstituted, preferably with water, just prior to consumption. This will ensure stability of the emulsion, although a little bit of creaming can occur due to the large lipid globules of the present composition. A small amount of creaming is beneficial since this also closely resembles the conditions of breast feeding.

Thus, the lipid and protein component-containing composition or the spray-dried lipid and protein component-containing composition according to the present invention are preferably administered to a human subject with an age of at most 36 months, preferably of at most 18 months, more preferably of at most 12 months, even more preferably of at most 6 months. In particular, the compositions obtained by the present process are suitable and prepared for providing the daily nutritional requirements to a human subject with an age of at most 36 months, in particular an infant with an age of at most 24 months, even more preferably an infant with an age of at most 18 months, most preferably with an age of at most 12 months. Hence, the lipid and protein component-containing composition or the spray-dried lipid and protein component-containing composition are used for feeding a human subject. Advantageously, it was found that the administration of a composition containing large lipid globules, preferably coated with polar lipids, prevents or reduces the risk of obesity and improves body composition, i. e. increases lean body mass and decreases fat mass, later in life.

After the optional spray-drying, the composition of the present invention is suitably in a powdered form, which can preferably be reconstituted with water to form a liquid. In a preferred embodiment it is foreseen, to add an aqueous medium, preferably water, to the spray-dried composition obtained so as to obtain a liquid or semi-liquid reconstituted spray-dried composition of the present invention. Thus, the present invention also relates to a liquid or semi-liquid reconstituted composition comprising the spray-dried composition obtained after spray-drying according to the present process in an aqueous medium. When the spray-dried composition is in a liquid form, the preferred volume administered on a daily basis is in the range of about 80 to 2500 ml, more preferably about 450 to 1000 ml per day. These amounts are also preferred for the liquid lipid and protein component-containing composition.

In a further preferred embodiment of the present invention, the present solid spray-dried composition or the liquid reconstituted spray-dried composition as well as the liquid lipid and protein component-containing composition may be supplemented with at least one further substance, in particular a pharmaceutically or nutritionally effective substance so as to obtain a pharmaceutical or nutritional composition comprising the present spray-dried, reconstituted or liquid composition.

In order to meet the caloric requirements of the infant the compositions preferably comprise 50 to 200 kcal/100 ml liquid, more preferably 60 to 90 kcal/100 ml liquid, even more preferably 60 to 75 kcal/100 ml liquid, when reconstituted with an aqueous medium if necessary. This caloric density ensures an optimal ratio between water and calorie consumption. The osmolality of the present compositions is preferably between 150 and 420 mOsmol/l, more preferably 260 to 320 mOsmol/l. The low osmolality aims to reduce the gastrointestinal stress. Preferably, in liquid form the compositions have a viscosity of at most 35 mPa·s, more preferably at most 6 mPa·s as measured in a Brookfield viscometer at 20° C. at a shear rate of 100 s$^{-1}$. Preferably, the protein component provides 5 to 15%, more preferably 6 to 12% of the total calories. More preferably protein is present in the compositions of at most 9% based on calories, more preferably the compositions comprise between 7.2 and 8.0% protein based on total calories, even more preferably between 7.3 and 7.7% based on total calories. A low protein concentration advantageously ensures a lower insulin response, thereby preventing proliferation of adipocytes in infants. Human milk comprises a lower amount of protein based on total calories than cow's milk. Based on dry weight the compositions preferably comprise less than 12 wt. % protein, more preferably between 9.6 to 12 wt. %, even more preferably 10 to 11 wt. %. Either based on the ready-to-feed liquid composition or the reconstituted spray-dried composition both preferably comprise less than 1.5 g protein per 100 ml, more preferably between 1.2 and 1.5 g, even more preferably between 1.25 and 1.35 g. The protein concentration in the compositions is determined by the sum of protein, peptides and free amino acids.

The digestible carbohydrate component preferably provides 30 to 80% of the total calories of the compositions.

Preferably, the digestible carbohydrate provides 40 to 60% of the total calories. When in liquid form, either as the ready-to-feed composition or the reconstituted spray-dried composition, the compositions preferably comprise 3.0 to 30 g digestible carbohydrate per 100 ml, more preferably 6.0 to 20, even more preferably 7.0 to 10.0 g per 100 ml. Based on dry weight the present spray-dried composition preferably comprises 20 to 80 wt. %, more preferably 40 to 65 wt. % digestible carbohydrates.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Further preferred embodiments of the present invention are subject of the subclaims.

The invention is further described by way of the following examples and the accompanying figures.

EXAMPLE 1

An infant formula was prepared being a powder comprising per kg final product about 4800 kcal, about 247 g lipid, about 540 g digestible carbohydrates, about 41 g non-digestible oligosaccharides and about 97 g protein. The composition was prepared using butter milk serum powder enriched in milk phospholipids, a vegetable oil blend (fat), demineralised whey powder (protein), lactose, and non-digestible oligosaccharides. Also vitamins, minerals, trace elements as known in the art were used.

The amount of butter milk serum powder was such that 1.62 wt. % phospholipids based on total lipids were present in the final composition.

An aqueous phase, comprising the butter milk powder, protein and digestible carbohydrates and the other ingredients, except the fat and fat soluble vitamins, was prepared as known in the art and heat treated to prevent bacterial contamination, namely by an Ultra High Temperature (UHT) treatment, as known in the art, after which an evaporation step was applied. The dry matter content of the aqueous phase was between 30 to 48 wt. % after the evaporation step. The mixture was heated to 50° C.

A fat phase was prepared as known in the art. The vegetable oil blend was also heated to 50° C. and added to the water phase in a w/w ratio of between 15 to 30 by injection and a centrifugal booster pump. The total solid content of the fat and aqueous phase mixture was between 40 and 60 wt %.

Accordingly, the aqueous and fat phase were fed into the inline mixer (Ystral Z80) comprising one mixing head. The rotar stator design of the inline mixer had 3 rows of teeth. The aqueous and fat phase were mixed with a tip speed of 20 to 50 m/s (resulting in a shear rate from 50000 to 100000/s) in order to emulsify the lipid phase into the aqueous phase and thereafter pumped with a positive displacement pump, a mono pump, with a pressure of about 8 bar to the heater.

Figure 1:
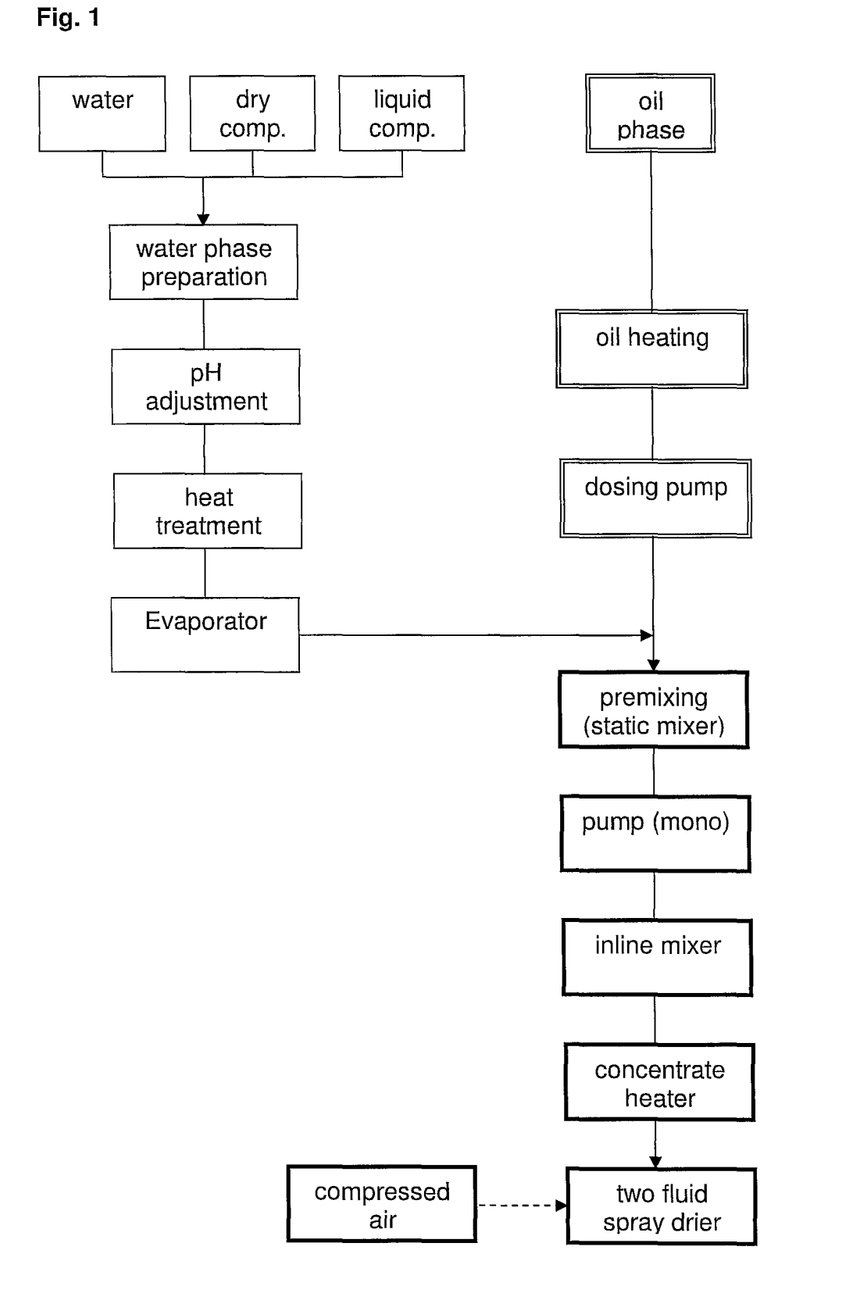
FIG. 1 shows a flow scheme of the present process, wherein comp. is short for components and panels with solid lines represent the aqueous phase, panels with double lines represent the lipid phase and panels with bold lines represent the mixture, i. e. the emulsion of both phases.
Figure 2:
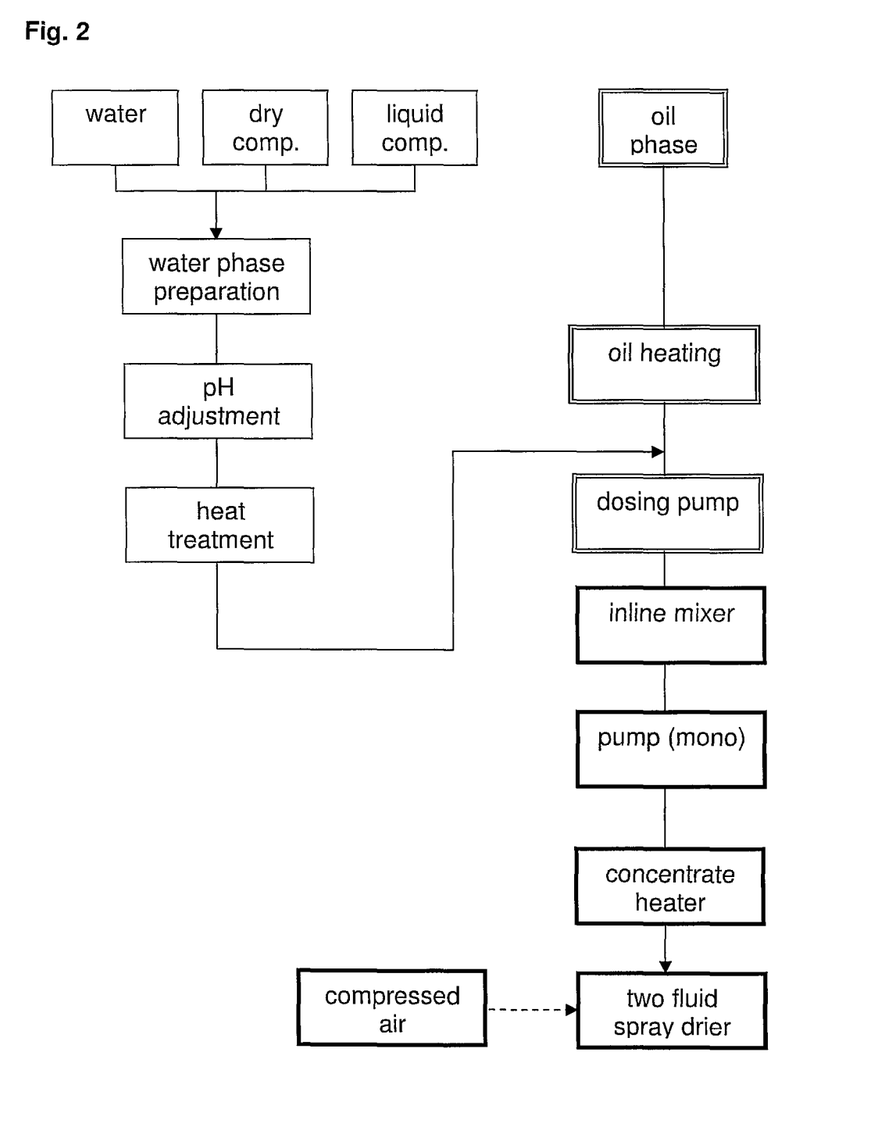
FIG. 2 shows a flow scheme of an alternative process of the present invention, wherein comp. is short for components and panels with solid lines represent the aqueous phase, panels with double lines represent the lipid phase and panels with bold lines represent the mixture, i. e. the emulsion of both phases.

The oil in water mixture was subsequently fed via the concentrate heater to the spray dryer, driven by the pump used downstream of the inline mixer (FIG. 2).

The emulsion was atomized with a low shear atomization system employing a two-fluid nozzle of Schlick (0/2-0/5 series), wherein the pressure used for spray-drying was below 8 bar, and dried with the inlet temperature of the drying gas being 195° C.

The size of the lipid globules in the final powder, after reconstitution with water, was measured with a Mastersizer 2000 (Malvern Instruments, Malvern UK). The volumetric mode diameter is (volume weighted mode diameter) 4.3 µm. About 60% of the lipid globules based on lipid volume had a diameter between 2 and 12 um.

Figure 3:
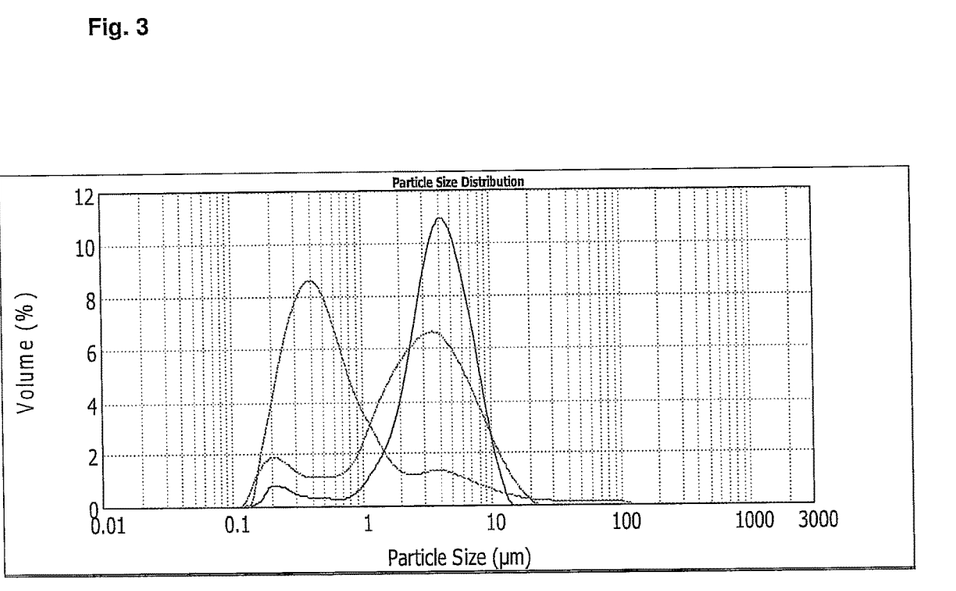
FIG. 3 shows the particle size distribution of a standard infant formula, of an infant formula of the present invention and of a sample of human breast milk

FIG. 3 shows the particle size distribution of various infant formulas. Powder was reconstituted with water to ready to drink liquid. A standard infant formula Nutrilon 1 (mode diameter (volume weighted mode diameter) 0.4 µm), an infant formula produced with the present process (mode diameter (volume weighted mode diameter) 3.6 µm) and a sample of human breast milk is shown (mode diameter (volume weighted mode diameter) 4.1 µm).

Figure 4:
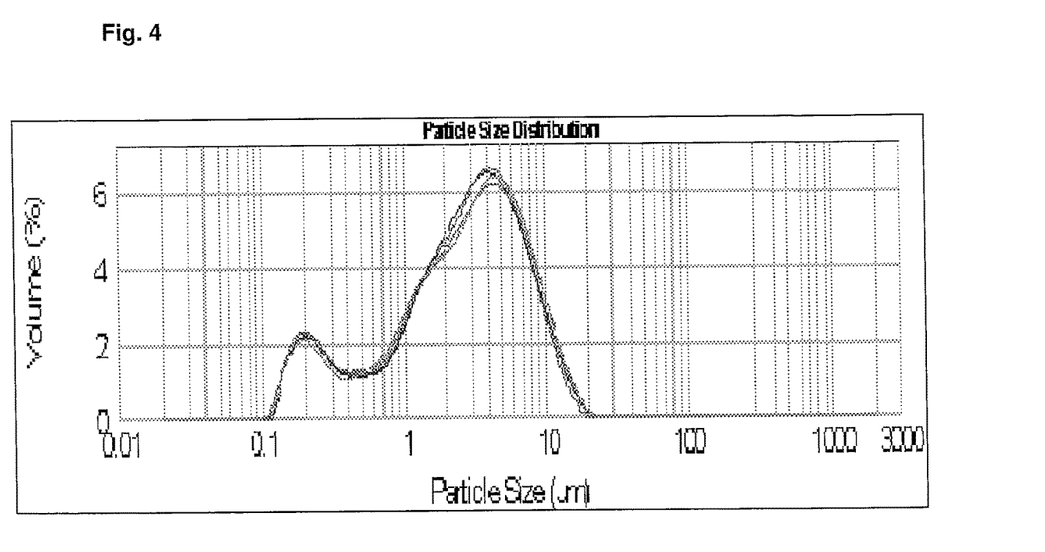
FIG. 4 shows the particle size distribution of the present infant formula taken during the production process.

FIG. 4 shows the particle size distribution of various samples of an infant formula obtained during production employing the present process. During the production process 7 different samples were taken for size distribution analysis. Volume mode (volume weighted mode diameter) is 4.3 µm (s.d. 0.2 µm). The figure clearly demonstrates the controllability of the present process.

EXAMPLE 2

Atomization with Nozzle with Internal Mixing Chamber

A similar composition as in example 1 was used. Atomization was performed with a 2F nozzle with internal mixing chamber (Lecher VarioJet). The pressure applied for atomization was between 4 and 8 bar. Results after atomization step show the lipid globules are slightly smaller, with a volume mode (volume weighted mode diameter) of about 2 um were obtained as compared to the globules in example above. The size distribution pattern was very similar.

The invention claimed is:

1. A process for preparing a lipid and protein component-containing composition, which is an infant or follow-on formula or a growing up milk and comprises lipid globules, comprising:
   a) providing an aqueous phase with a dry matter content of 10% to 60 wt.% (based on total weight of the aqueous phase), the aqueous phase including at least one protein component;
   b) providing a liquid lipid phase having at least one lipid; and c) mixing the lipid phase with the aqueous phase in a ratio of 5% to 50% (w/w) using an inline mixer with at least one mixing head at a pressure of no greater than 10 bar so as to obtain a lipid and protein component-containing composition comprising lipid globules having a volume-weighted mode diameter of at least 1.0 μm, wherein the process does not include the use of a homogeniser, and wherein using the inline mixer exerts tangential shear to obtain the lipid and protein component-containing composition comprising lipid globules having the volume-weighted mode diameter of at least 1.0 μm.

2. The process according to claim 1, wherein the liquid lipid phase provided in step b) is fed into the aqueous phase provided in step a) prior to or during mixing step c).

3. The process according to claim 2, wherein the inline mixer with at least one mixing head exerts a low shear force during mixing.

4. The process according to claim 1, wherein the protein component is selected from a group consisting of skim milk, whey, whey protein, whey protein isolate, whey protein hydrolysate, casein, casein hydrolysate and soy protein.

5. The process according to claim 1, wherein the aqueous phase comprises at least one further component selected from a group consisting of digestible carbohydrates, non-digestible carbohydrates, vitamins and minerals.

6. The process according to claim 1, further comprising heating the liquid lipid phase to a temperature of at least 40° C. prior to mixing with the aqueous phase.

7. The process according to claim 1, wherein the inline mixer with at least one mixing head in step c) mixes the lipid and aqueous phases with a tip rotor speed of at least 25 m/s.

8. The process according to claim 1, wherein the aqueous phase is provided with a dry matter content of 30% to 50 wt.% (based on total weight of the aqueous phase).

9. The process according to claim 1, wherein subsequent to step a) and prior to step c) the aqueous phase is sterilised or pasteurised.

10. The process according to claim 1, wherein the lipid and protein component-containing composition obtained in step c) is heated to 75° C. to 85° C.

11. The process according to claim 1, wherein the aqueous phase, the lipid phase, or the aqueous and the lipid phase comprise phospholipids in an amount of 0.5 to 20 wt.% (based on total lipid of the composition).

12. The process according to claim 1, wherein the lipid and protein component-containing composition obtained in step c) is spray-dried with an atomization system employing a two-fluid nozzle so as to obtain a spray-dried lipid and protein component-containing composition comprising lipid globules.

13. The process according to claim 12, wherein a pressure used for spray-drying is at most 10 bar.

14. The process according to claim 12, wherein an inlet temperature for a drying gas used for spray-drying is at least 180° C.

15. The process according to claim 2, wherein the liquid lipid phase is emulsified into the aqueous phase in the inline mixer at a shear rate from 50,000 $s^{-1}$ to 100,000 $s^{-1}$.

16. A process for preparing a lipid and protein component-containing composition, which is an infant or follow-on formula or a growing up milk and comprises lipid globules, comprising:

a) providing an aqueous phase with a dry matter content of 10% to 60 wt.% (based on total weight of the aqueous phase), the aqueous phase including at least one protein component;

b) providing a liquid lipid phase having at least one lipid;

c) dispersing the liquid lipid phase into the aqueous phase in a ratio of 5% to 50% (w/w) using an inline mixer with at least one mixing head at a pressure of no greater than 10 bar to generate an emulsion comprising lipid globules having a volume-weighted mode diameter of at least 1.0 μm; and d) atomizing the emulsion with a spray dryer to obtain the lipid and protein component-containing composition, wherein the process does not include the use of a homogeniser, and wherein using the inline mixer exerts tangential shear to obtain the lipid and protein component-containing composition comprising lipid globules having the volume-weighted mode diamter of at least 1.0 μm.

17. The process according to claim 16, wherein the emulsion has an apparent dynamic viscosity between 30 and 80 cP.

18. The process according to claim 16, wherein the lipid and protein component-containing composition includes lipid globules having a volume-weighted mode diameter of from 4 to 7 μm.

19. The process according to claim 5, wherein the aqueous phase comprises lactose.

* * * * *